(12) United States Patent
Wang et al.

(10) Patent No.: US 11,340,997 B2
(45) Date of Patent: May 24, 2022

(54) METHOD, DEVICE AND COMPUTER PROGRAM PRODUCT FOR TRANSMITTING DATA

(71) Applicant: EMC IP Holding Company LLC, Hopkinton, MA (US)

(72) Inventors: Yi Wang, Chengdu (CN); Jun Tang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 122 days.

(21) Appl. No.: 16/792,843

(22) Filed: Feb. 17, 2020

(65) Prior Publication Data

US 2021/0117286 A1     Apr. 22, 2021

(30) Foreign Application Priority Data

Oct. 18, 2019   (CN) .......................... 201910991616.2

(51) Int. Cl.
*G06F 12/00* (2006.01)
*G06F 11/14* (2006.01)
*H04L 9/06* (2006.01)
*G06F 9/54* (2006.01)

(52) U.S. Cl.
CPC .......... *G06F 11/1464* (2013.01); *G06F 9/542* (2013.01); *G06F 11/1451* (2013.01); *G06F 11/1461* (2013.01); *G06F 11/1469* (2013.01); *H04L 9/0643* (2013.01)

(58) Field of Classification Search
CPC ............. G06F 11/1464; G06F 11/1451; G06F 11/1461; G06F 11/1469; G06F 9/542; G06F 3/0646; G06F 3/065; H04L 9/0643
See application file for complete search history.

(56) References Cited

U.S. PATENT DOCUMENTS 8,805,953 B2 *  8/2014  Murphy .............. G06F 11/1469
                                                                709/217

* cited by examiner

*Primary Examiner* — Shawn X Gu
(74) *Attorney, Agent, or Firm* — Womble Bond Dickinson (US) LLP

(57) ABSTRACT

Embodiments of the present disclosure provide a method, a device and a computer program product for transmitting data between different types of storage systems. In one embodiment, for example, the method comprises recovering data from a file to be transmitted in a first backup system. The method also comprises sending the recovered data to a backup client corresponding to a second backup system. In one embodiment, the backup client is installed in a container of the first backup system and the first and the second backup systems belong to different types. The method further comprises transmitting the recovered data from the backup client installed in the first backup system to the second backup system.

17 Claims, 5 Drawing Sheets

METHOD, DEVICE AND COMPUTER PROGRAM PRODUCT FOR TRANSMITTING DATA

CROSS-REFERENCE TO RELATED APPLICATION

This patent application claims priority, under 35 U.S.C. § 119, of Chinese Patent Application No. 201910991616.2, filed Oct. 18, 2019, which is incorporated by reference herein in its entirety.

FIELD

Embodiments of the present disclosure generally relate to the field of data backup, and more specifically, to a method, a device and a computer program product for transmitting data.

BACKGROUND

Users usually store files and data in a backup system to avoid data loss, so the backup system often can store a large amount of data. In case of data failure or disaster, data may be recovered via the backup system to avoid unnecessary loss. The types of data backup may be classified into full backup, incremental backup, differential backup and selective backup etc. The data backup may also be divided into hot backup and cold backup based on whether the system is in a normal operating state.

With the improvement of new technologies, new backup systems continue to be developed. When a user purchases a new backup system, it is required to transfer the backup data from an old backup system to the new backup system, such that all of the old backup data are kept in the new backup system. After the backup data has been stored in the new backup system, the user may eliminate the old backup system and the storage space in the old backup system is released.

SUMMARY

Embodiments of the present disclosure provide a method, a device and a computer program product for transmitting data.

In one aspect of the present disclosure, there is provided a method of transmitting data. The method comprises: recovering data from a file to be transmitted in a first backup system; sending the recovered data to a backup client corresponding to a second backup system, the backup client being installed in a container of the first and the first backup system and the second backup system being different types of backup systems; and transmitting the recovered data from the backup client installed in the first backup system to the second backup system.

In another aspect of the present disclosure, there is provided a device for transmitting data. The device comprises a processing unit and a memory coupled to the processing unit and storing with instructions. The instructions, when executed by the processing unit, causing the device to perform acts comprising: recovering data from a file to be transmitted in a first backup system; sending the recovered data to a backup client corresponding to a second backup system, the backup client being installed in a container of the first backup system, and the first and the second backup systems being different types of backup systems; and transmitting the recovered data from the backup client installed in the first backup system to the second backup system.

In a further aspect of the present disclosure, there is provided a computer program product being tangibly stored on a non-transitory computer-readable medium and comprising machine-executable instructions, which, when executed, causing a machine to perform the method or process in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of respective embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, where the same reference sign usually refers to the same component in the example embodiments of the present disclosure.

DETAILED DESCRIPTION OF EMBODIMENTS

Preferred embodiments of the present disclosure will be described in more detail below with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless indicated otherwise.

Generally, it is not easy to move data between different types of backup systems (i.e., heretical backup systems). This is because different backup systems have different backup data structures and different de-duplication algorithms. Accordingly, unlike direct data movements between the same type of backup systems, normally, it is impossible to simply move all contents including hash values and de-duplicated data directly into different types of backup systems. Instead, it is normally required to recover backup data and then create, in a new backup system, a backup in a new data format using the recovered data.

Traditionally, there are two types of solutions of transmitting data between different types of backup systems.

Figure 1:
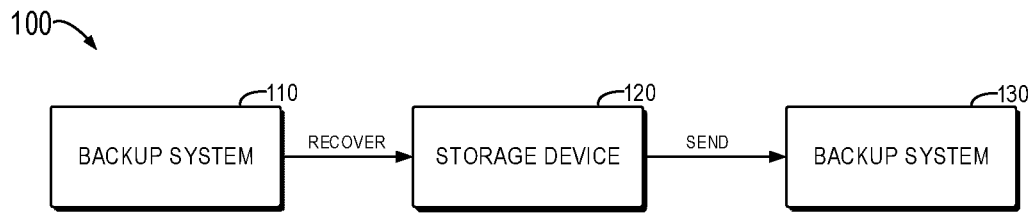
FIG. 1 illustrates a schematic diagram of a conventional solution of transmitting data between different types of backup systems.

FIG. 1 illustrates a schematic diagram of a conventional solution 100 of transmitting data between different types of backup systems. As shown in FIG. 1, backup systems 110 and 130 are different types of backup systems, and they differ in software and/or hardware. When it is required to move data from the backup system 110 to the backup system 130, a client of the backup system 110 is installed first, data recovery (e.g., rehydrate) is performed, and the recovered data is then stored in a storage device 120 (e.g., a disk). Afterwards, it is required to install a client of the backup system 130, and read data from the storage device 120, and then the backup of the data is created in the backup system 130.

However, this conventional solution has following deficiencies. First of all, backup data is recovered and created sequentially with low performance. In this conventional solution, the backup to a new backup system is created only after all data are recovered for one backup. This is because the old recovering client and the new data sending client work independently and the client of the new backup system will never know whether the client of the old backup system has already recovered all the backup data. Thus, if the client of the new backup system starts to scan and create backup before the recovery task completes, it is possible that some files may not be recovered before the new client creates a backup of the scanned files. For example, assuming a directory A has file 1, file 2 and file 3, when the new backup system creates a backup for the directory A, the client of the new system only finds file 1 and file 2 since file 3 has not been recovered to the directory yet. As a result, file 3 may be missing and causes data loss. Therefore, it is required that the creation of the backup to the new backup system is started only after the recovery task completes, which causes data movement inefficiency. Secondly, low performance is caused by excessive I/O operations. In this conventional solution, it is required to perform a lot of I/O operations on the storage device to recover and read file data, but too many I/O operations have a great impact on the performance of data movement. Thirdly, cost of the storage device is a deficiency. In this conventional solution, a dedicated storage device 120 is required for storing the recovered data, which increases the costs of data movement.

Figure 2:
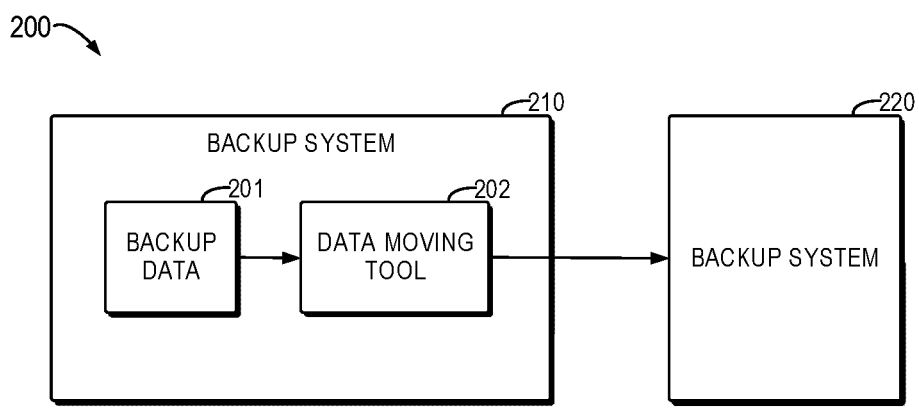
FIG. 2 illustrates a schematic diagram of a further conventional solution of transmitting data between different types of backup systems.

FIG. 2 illustrates a schematic diagram of a further conventional solution of transmitting data between different types of backup systems. As shown in FIG. 2, backup systems 210 and 220 are different types of backup systems and they differ in software and/or hardware. When it is required to move backup data 201 in the backup system 210 to the backup system 220, it is required that a dedicated data moving tool 202 is developed and deployed in the backup system 210 to realize data recovering and sending in a pipeline fashion.

However, in this conventional solution, a lot of effort is required to develop one dedicated data moving tool for every new backup system. A dedicated data moving tool needs to be developed for every new backup system because each has its own rules for transmitting and storing backup data. Developing a dedicated data moving tool for each new backup system has following disadvantages. First of all, it brings security issues. Usually, sending data to a new backup system is done by internal key logic. Logic for sending data is crucial to a backup system because a data de-duplication algorithm and data structure for storing the backup data may be involved. Thus, when the data sending module is developed in a data moving tool, it is required to know the internal logic for creating the backup to a new backup system, but it is unsafe to expose the logic to the data moving tool which may belong to a different backup system. Under certain circumstances, it is even impossible to obtain the data sending logic due to a lack of privilege, which makes the solution of the dedicated data moving tool unfeasible. Thus, it is possible that the first conventional solution with an additional storage device needs to be chosen instead. Secondly, the development is inefficient. To develop the data moving tool, it is required to merge the data recovering logic of the old backup system with the data sending logic of the new backup system. In addition, it is required to make the data moving tool work efficiently to design a good pipeline and a related module. It is inefficient to develop respective dedicated data moving tools for each new backup system. Moreover, it takes a lot of effort to maintain so many dedicated data movement tools.

Accordingly, in the conventional solutions, a storage device needs to be set to store the recovered data, or it is required to develop data moving tools for various types of backup systems, separately. Both of them result in low transmission efficiency and high costs.

To this end, embodiments of the present disclosure provide a new solution of moving data between different types of backup systems. When data is transmitted between different types of backup systems, the data transmission efficiency can be improved by installing, in a container of a backup system, a backup client corresponding to another backup system according to the embodiments of the present disclosure, without developing data moving tools for each backup system, separately. Furthermore, since it is not necessary to expose the internal logic of the backup system, the solution of the embodiments of the present disclosure is much safer than the conventional one which uses the dedicated data moving tools.

Besides, in accordance with some embodiments of the present disclosure, different backup clients are independently deployed using a Docker container, which facilitates development, and meanwhile avoids conflicts among the backup clients. Since the Docker container puts no requirements on guest OS, the cost is relatively low. Furthermore, according to some embodiments of the present disclosure, a location mapping file is also used to check the already sent data to decrease the volume of data transmission and improve the performance of data movement.

Basic principles and several example implementations of the present disclosure are illustrated below with reference to FIGS. 3 to 9. It should be understood that the example embodiments are provided merely for enabling those skilled in the art to better understand and further implement the embodiments of the present disclosure, rather than limiting the protection scope of the present disclosure in any manner.

Figure 3:
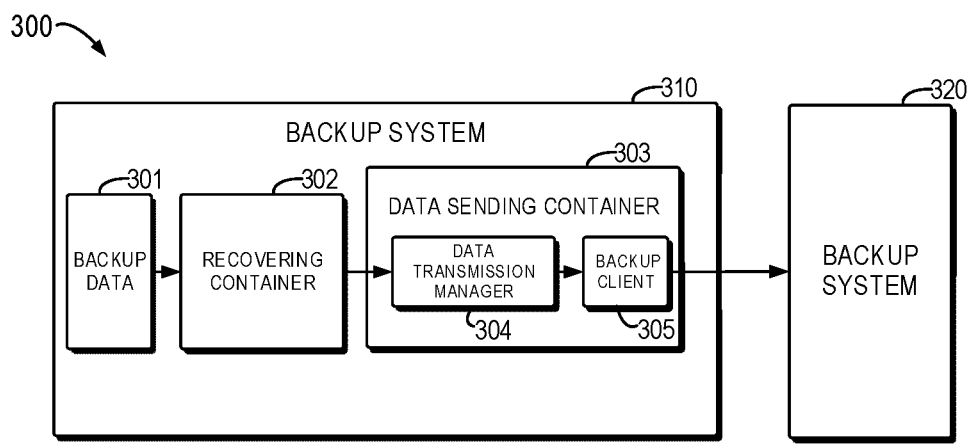
FIG. 3 illustrates a block diagram of example architecture of transmitting data between different types of storage systems in accordance with embodiments of the present disclosure.

FIG. 3 illustrates a block diagram of an architecture 300 of transmitting data between different types of storage systems in accordance with embodiments of the present disclosure. As shown in FIG. 3, the architecture 300 includes a backup system 310 and a backup system 320 which are different types of backup systems, i.e., they differ in software and/or hardware. In some embodiments of the present disclosure, the source backup system 310 is referred to as old backup system while the destination backup system 320 is referred to as new backup system. However, the relationship between the two backup systems may not be new or old, as long as the types of the two backup systems are different.

Referring to FIG. 3, in accordance with embodiments of the present disclosure, the backup system 310 is provided therein with a recovering container 302 and a data sending container 303, where the recovering container 302 is used for recovering backup data 301 in the backup system 310. The data sending container 303 includes a data transmission manager 304 and a backup client 305, where the data transmission manager 304 is used to perform a flow control on the data transmission process and the backup client is a corresponding backup client of the backup system 320, i.e., a built-in backup client of the backup system 320. A backup client 305 is installed in the data sending container 303. Container technology is an approach for implementing virtualization of an operating system and may run applications and dependencies thereof in a process in which resources are isolated. By using the container, the codes, configurations and dependency of applications may be easily packed and turned them into building blocks easy for use, thereby achieving many targets, such as environmental consistency, operation efficiency, developer productivity and version control etc. Containers may help ensure rapid, reliable and consistent deployments of the applications without being affected by deployment environments. Generally, containers are more lightweight than virtual machines and put no requirements on guest OS.

Therefore, according to the architecture 300 of the embodiments of the present disclosure, the recovered data in the backup system 310 is transmitted, via the backup client 305 of the backup system 320, to the backup system 320. The backup client 305 is a built-in client in the backup system 320, thus avoiding the development of dedicated data moving tools and it is also not required to know or to expose the internal logic of respective backup systems, thus improving data security.

Figure 4:
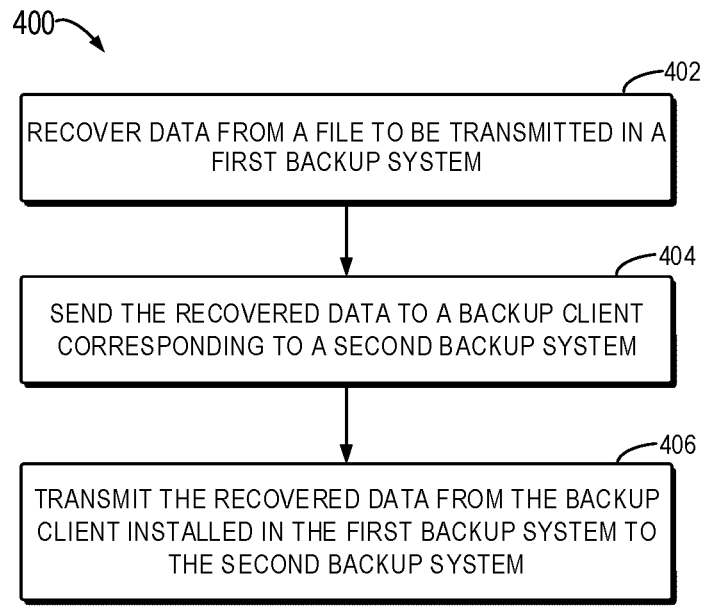
FIG. 4 illustrates a flowchart of a method of transmitting data between different types of storage systems in accordance with embodiments of the present disclosure.

FIG. 4 illustrates a flowchart of a method 400 of transmitting data between different types of storage systems in accordance with embodiments of the present disclosure. For example, the method may be performed by the backup system 310 in the architecture 300 described above with reference to FIG. 3.

At 402, data is recovered from a file to be transmitted in the first backup system. For example, the recovering container 302 recovers the data from a file of the backup data 301 in the backup system 310. In a backup system, data is usually segmented into chunks and a hash value of respective data chunks is then calculated. Data chunks with the same hash value are processed with de-duplication, i.e., the plurality of data chunks with the same hash is stored only once in the storage system. Recovery may be considered as an act opposite to de-duplication. As the de-duplication algorithm may differ from one backup system to another, it is required to recover the de-duplicated data and send it to a new backup system. Afterwards, the new backup system de-duplicates the received backup data based on its own de-duplication algorithm.

At 404, the recovered data is sent to the backup client corresponding to the second backup system, where the backup client is installed in a container of the first backup system and the first and second backup systems are different types of backup systems. For example, the recovering container 302 sends the recovered data to a data transmission manager 304 in the data sending container 303 and further to the backup client 305, where the backup client is a built-in backup client in the backup system 320 and is installed in the data sending container 303.

At 406, the recovered data is transmitted from the backup client installed in the first backup system to the second backup system. For example, the recovered data is sent from the backup client 305 to the backup system 320. Accordingly, the method 400 in accordance with embodiments of the present disclosure neither requires an additional storage device nor requires development of corresponding data moving tools for various types of backup systems.

Thus, when data is transmitted between different types of backup systems, according to embodiments of the present disclosure, data transmission efficiency is improved by installing, in a container of a backup system, a backup client corresponding to another backup system, without developing respective data moving tools for each backup system, separately. Further, since the internal logic of the backup system is not exposed, embodiments of the present disclosure is much safer.

Figure 5:
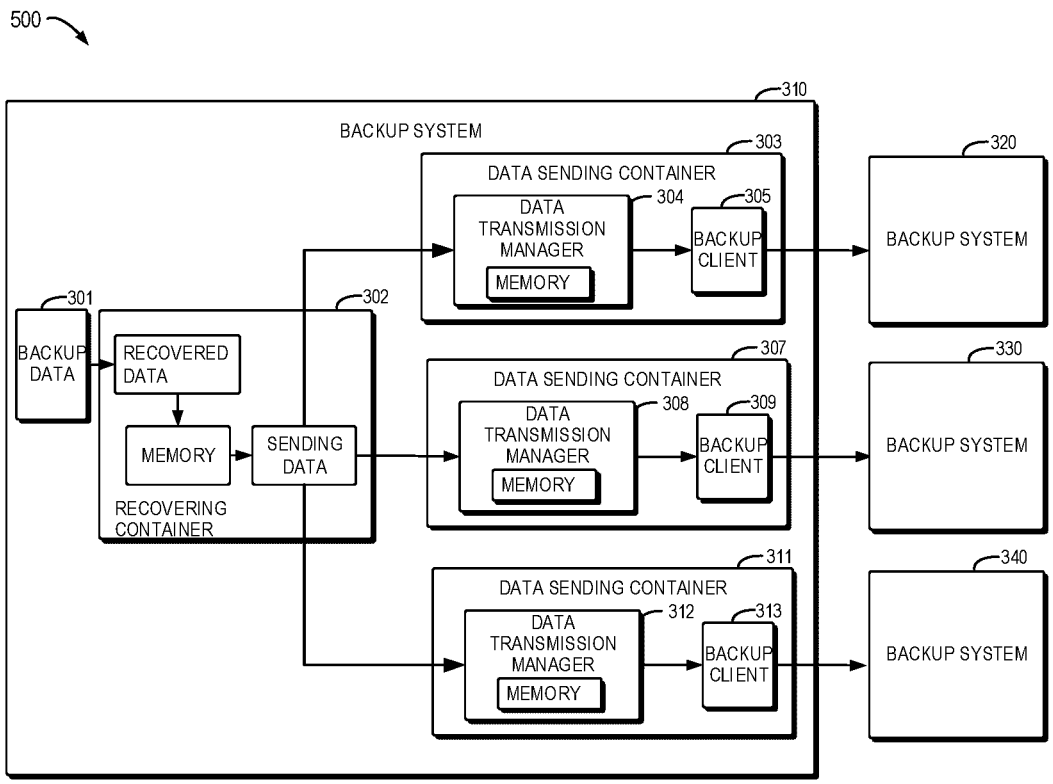
FIG. 5 illustrates a schematic diagram of another example architecture of transmitting data between different types of storage systems in accordance with embodiments of the present disclosure.

FIG. 5 illustrates a schematic diagram of another example architecture 500 of transmitting data between different types of storage systems in accordance with embodiments of the present disclosure. As shown in FIG. 5, compared with the architecture 300 in FIG. 3, the architecture 500 of FIG. 5 includes a plurality of data sending containers, e.g., data sending containers 303, 307 and 311, thus being able to support concurrent data transmission to a plurality of backup systems 310, 330 and 340 and further improving data transmission efficiency.

As shown in FIG. 5, a backup client is installed for each new backup system using a Docker container. For example, the client 305 corresponding to the backup system 320 is installed in the data sending container 303, the client 309 corresponding to the backup system 330 is installed in the data sending container 307 and the client 313 corresponding to the backup system 340 is installed in a data sending container 311. Further, data transmission managers 304, 308 and 312 are also involved to receive and send data. In a source backup system 310, the recovering container 302 recovers the file one by one from the backup data 301. Next, the recovering container 302 notifies the data transmission manager 304 in the data sending container 303 to prepare receiving data from the recovering container 302. Then, the data transmission manager 304 in the data sending container 303 allocates storage resources to receive data from the recovering container 302. Meanwhile, the data transmission manager 304 notifies a new system backup client 305 to start reading data from a memory and send the received data to the new backup system 320. In some embodiments, each data transmission manager may include a file data receiver and a file data sender.

In the architecture of FIG. 5, the data transmission manager 304 is used for controlling a workflow pipeline to ensure simultaneous execution of data receiving and data sending. The control of the workflow is further described in detail below with reference to FIG. 6. In addition, while creating backup for the received data to the new backup system 320, the backup client 505 may also optimize data transmission with hash values. The data chunks, which are not required for transmission, are synthesized at the new backup system 320. Example implementations of reducing the volume of data transmission by hash matching are described below with reference to FIG. 7.

Therefore, compared with the conventional solutions, solutions of the architecture 500 in accordance with embodiments of the present disclosure have the following advantages.

A first advantage is high performance. In the embodiments of the present disclosure, the recovered data is temporarily stored in a memory, which is much faster than storing the recovered data in a storage device. Meanwhile, in accordance with embodiments of the present disclosure, a pipeline is created to ensure simultaneous execution of data recovering and data sending, thereby enhancing performance.

A second advantage is ease of deployment and low system cost. Different backup systems may require different system configurations to deploy their backup clients. Sometimes, these configurations may conflict with each other. Due to the possible configuration conflict, it may be impossible to deploy a plurality of backup clients in one backup server. However, in the embodiments of the present disclosure, Docker is used to deploy different clients independently. Thus, there is no conflict in the system configurations. Meanwhile, the Docker container itself puts no requirements on guest OS, so the system cost of the Docker container per se is lower than the virtual machine which requires a guest OS.

A third advantage is that security of the internal logic is ensured. In conventional solutions, it is necessary to understand the logic for transmitting data to a new backup system, so as to synthesize the data sending logic into the dedicated data movement tools. However, in the embodiments of the present disclosure, it is only necessary to use an existing new backup system client to converse with a data transmission manager and data is sent according to the designed protocol. Therefore, it is unnecessary to expose the internal logic to any dedicated data moving tools.

A fourth advantage is high development efficiency. In the conventional solutions, dedicated tools for each new backup system are required. Too many efforts are required on development and maintenance for such a large amount of dedicated tools. In the embodiments of the present disclosure, with only a common data transmission manager, the client may communicate with the data transmission manager through simple protocols to send data, which is highly efficient for development.

A fifth advantage is low cost without storage devices. In the embodiments of the present disclosure, memory is used to recover and send data in a pipeline, thus requiring no additional storage device.

A sixth advantage is the backup data can be simultaneously moved to a plurality of destination backup systems. In the embodiments of the present disclosure, connections may be set up with different data sending containers. Thus, the data may be recovered once, be sent to a plurality of data sending containers efficiently and simultaneously and further concurrently transmitted to a plurality of backup systems.

Figure 6:
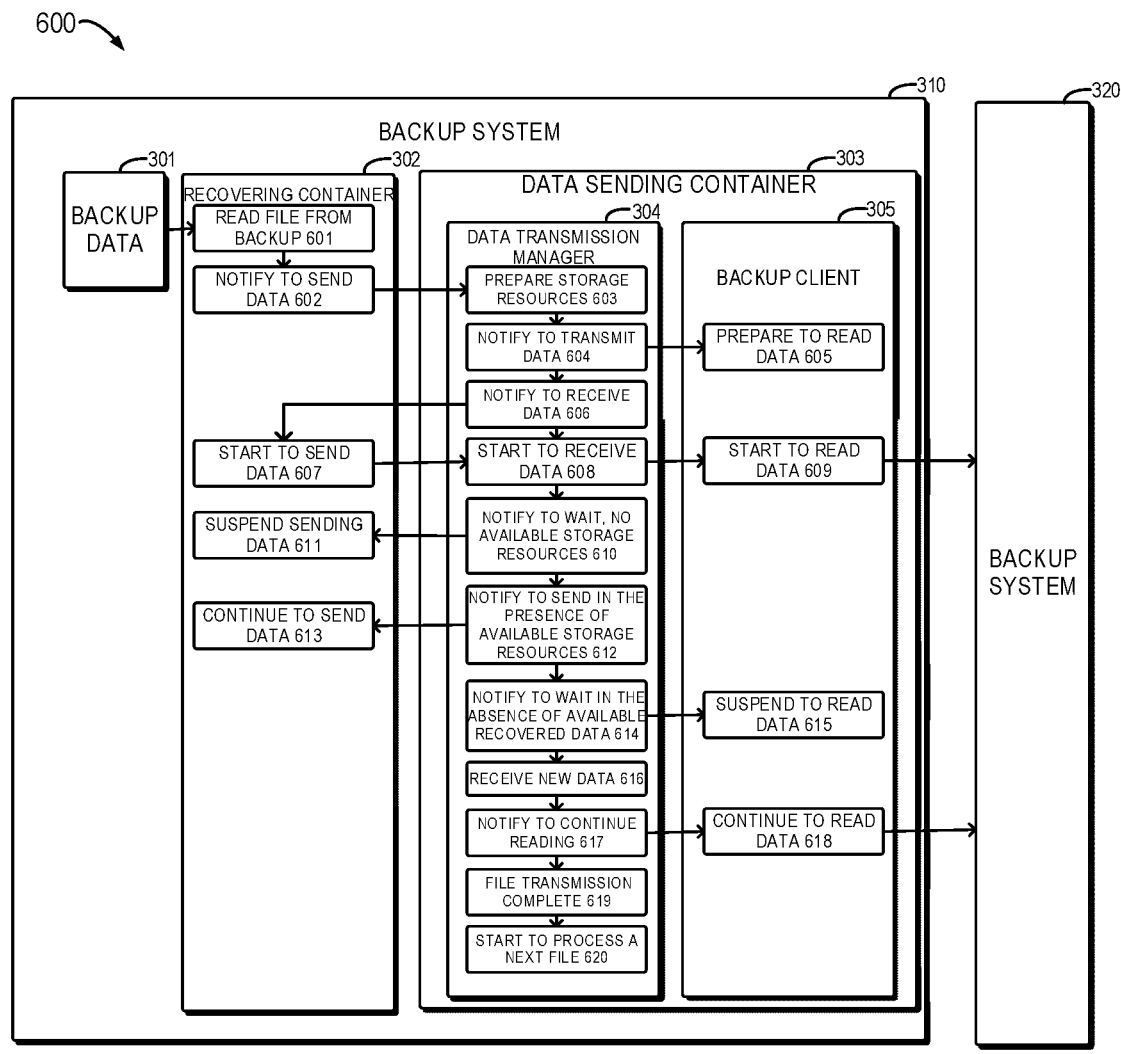
FIG. 6 illustrates a schematic diagram of a workflow of controlling data transmission between backup systems in accordance with embodiments of the present disclosure.

FIG. 6 illustrates a schematic diagram of a workflow 600 for controlling data transmission between backup systems in accordance with embodiments of the present disclosure. In the architecture of the embodiments of the present disclosure, the flow control may be done by the data transmission manager 304.

Because only a limited amount of storage resources are allocated in the data sending container 303, the data may not always be received from the recovering container 302. Although storage resources are allocated to receive data chunks and the storage resources are released after the data chunks are sent to a destination, if the data are sent from the recovering container 302 to the data transmission manager 304 at a faster rate than from the data transmission manager 304 to the client 305, too many storage resources may be needed, even leaving no available resources to continue receiving new recovered data from the recovering container 302. Thus, in the embodiments of the present disclosure, the data transmission manager 304 allocates storage pools before data transmission and checks whether there are available storage resources in the allocated storage pools. If there are no available resources, the data transmission manager 304 will notify the recovering container 302 to wait until there are new available storage resources.

Furthermore, the recovered data chunks are received one by one from the recovering container 302, so the backup client 305 may not always continue to read the recovered data because a failure may occur due to that the required data chunks have not yet been received. Therefore, the data transmission manager 304 will check the available data chunks and notify the system client 305 to wait if new data chunks have not been received.

As shown in FIG. 6, the recovering container 302 reads a file from the backup data 301 for recovery at 601. The recovering container 302 notifies sending the recovered data at 602. The data transmission manager 304 prepares storage resources for receiving file data at 603. At 604, the data transmission manager 304 notifies the client 305 to transmit file data and create backup. At 605, the backup client 305 prepares to read data from a memory. At 606, the data transmission manager 304 notifies the recovering container 302 to receive data. At 607, the recovering container 302 starts to send file data. At 608, the data transmission manager 304 starts to receive the file data. At 609, the backup client 305 starts to read data from the memory and creates backup.

During data transmission, the data transmission manager 304 may periodically or non-periodically determine whether an available storage resource is present. If there is no available storage resource, the data transmission manager 304 notifies waiting at 610. At 611, the recovering container 302 suspends sending data. If it is determined that there is available resource again at 612, then notification to send data continues. At 613, the recovering container 302 continues to send data.

During data transmission, the data transmission manager 304 may also determine whether there is available recovered data in the memory. If there is no available recovered data, then at 614, the data transmission manager 304 notifies to wait. At 615, the backup client 305 suspends reading data from the memory. At 616, the data transmission manager 304 continues receiving new recovered data. At 617, the data transmission manager 304 notifies the backup client 305 to continue to read the data. At 618, the backup client 305 continues to read data. At 619, the data transmission manager 304 determines that the transmission of the file is completed, then at 620, a next file in the backup is processed in a similar way.

In some embodiments, a sending notification from the recovering container 302 to the data transmission manager 304 at 602 may include a file name, a file path and a file size, and a reading notification from the data transmission manager 304 to the backup client 305 at 604 may include a file name, a file path, a file size and an address of the memory, where there is one more address of the memory in the reading notification, compared with the sending notification. Since the storage resources are allocated to receive the data from the recovering container 302, the address of the memory should be sent to the backup client 305, such that the backup client 305 can read data from the address of the memory.

Figure 7:
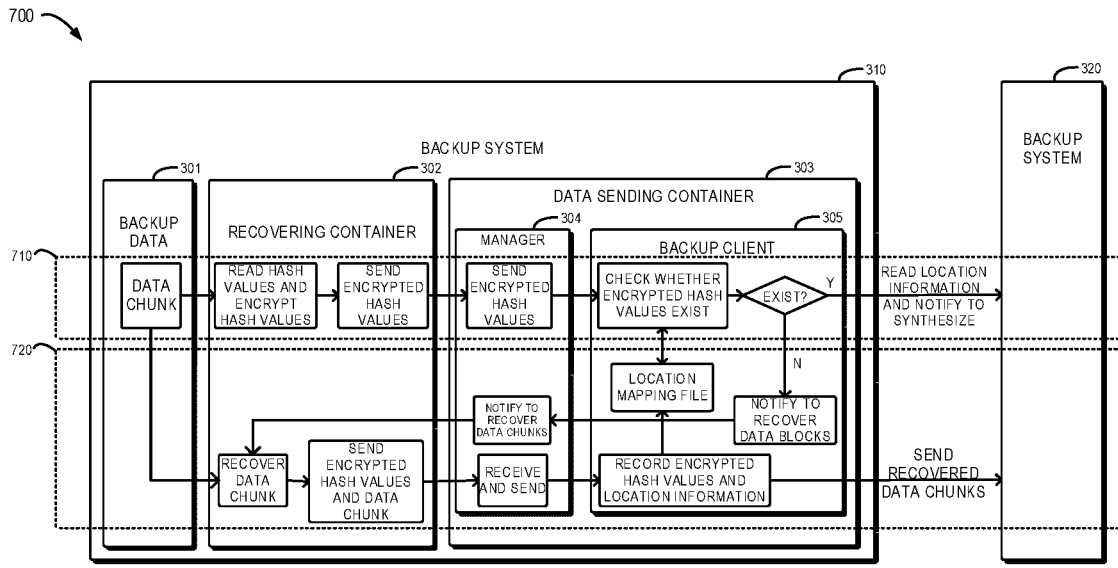
FIG. 7 illustrates a schematic diagram of a process of reducing the volume of data transmission using a location mapping file in accordance with embodiments of the present disclosure.

FIG. 7 illustrates a schematic diagram of a process 700 of reducing the volume of data transmission using a location mapping file in accordance with embodiments of the present disclosure. Normally, data is stored in a backup system in a de-duplicating manner. As a result, it is usually required to recover the same data chunk several times during data recovery. Moreover, there may also be the same data chunks in different files.

As the efficiency of recovering and sending the same data chunks multiple times is low, it is required to find data chunks that have already been sent. However, it is not easy to find the already existing data chunks in different types of backup systems. Usually, when it is desired to check the presence of a data chunk, it is required to calculate the hash value of the data chunk, and to send the hash value to the backup system, after that, the backup system checks whether the hash value exists and returns a result. However, it is impossible to check by the hash value when data is moved between different types of backup systems, it is because different backup systems will not expose their hash value to the outside. In general, exposing a hash value to the outside brings security issues. Therefore, when data is to be moved between different types of backup systems, a hash value is calculated, by the old backup system, in the data structure of the old backup system, thus it is impossible to use this hash value to check whether the hash value has already existed in a new backup system of different types.

In the embodiments of the present disclosure, the performance may be further boosted by synthesizing. Synthesizing refers to a method of notifying a destination server to reference existing data thereon. Instead of sending data to the destination server, using data synthesis it is only necessary to notify the destination server to perform synthesizing. For example, in some storage systems, it is possible to use certain interfaces to notify the destination server to employ the existing data, rather than transmitting the data again. Therefore, by avoiding sending the existing data, performance can be greatly improved and the consumption of network resources is reduced.

As shown in FIG. 7, hash values are provided to avoid repetitively sending the existing data in the backup system 320 at block 710. At block 720, data chunks, which have not been sent, are sent to the backup system 320 and the encrypted hash value and location information of the data chunks are recorded in a location mapping file of the data sending container 303.

At block 710, the recovering container 302 reads the data chunks in the backup data 301, calculates the hash value of the data chunks and then encrypts the hash value. Then, the encrypted hash value is sent to the data transmission manager 304 and further to the client 305. It is determined, at the client 305, whether the encrypted hash value has already been present in the location mapping file. If yes, the client 305 directly reads, from the location mapping file, the location information of the data chunks in the backup system 320 and notifies the backup system 320 to perform data synthesizing. Security of the backup system 310 can be guaranteed by encrypting the hash value.

At block 720, if the encrypted hash value of the data chunks is absent in the location mapping file, it means that the data chunks have not been sent to the backup system 320 before. Then, the client 305 notifies to recover the data chunks and the recovering container 320 recovers the data chunks and sends the data chunks to the backup system 320. Meanwhile, the encrypted hash values of the data chunks as well as their locations in the backup system 320 are recorded in the location mapping file.

The location mapping file records with the encrypted hash value calculated by the backup system 310 and locations of the data chunks in the backup system 320. Since the hash value is encrypted, it will not be exposed to the outside. Meanwhile, locations of the data chunks are stored in the backup client 305, so the data locations of the backup system 320 will not be disclosed. In this way, synthesizing can be performed safely between different types of backup systems, thereby boosting the performance of data transmission.

Figure 8:
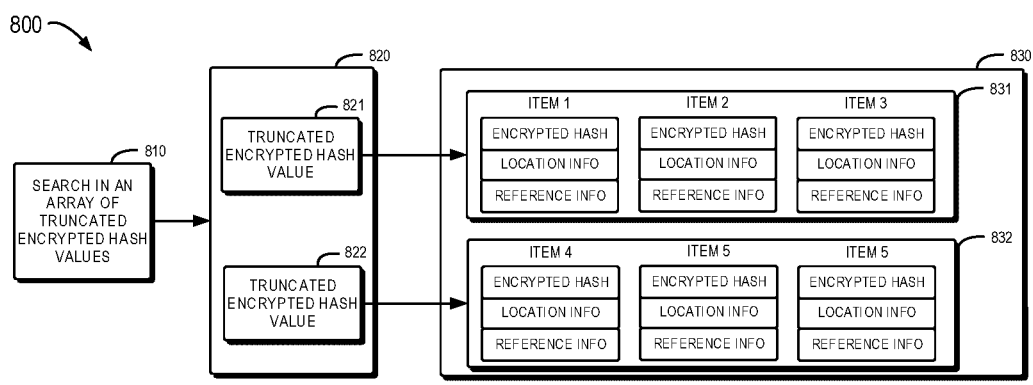
FIG. 8 illustrates a schematic diagram of a location mapping file in accordance with embodiments of the present disclosure.

FIG. 8 illustrates a schematic diagram of a location mapping file 800 in accordance with embodiments of the present disclosure. A data structure of the location mapping file 800 is shown in FIG. 8. At 810, a search may be performed in an array of truncated encrypted hash values, where a plurality of truncated encrypted hash values 820 includes truncated encrypted hash values 821 and 822. Each truncated encrypted hash value is mapped to a corresponding group of hash encrypted values, where the encrypted hash values have the same truncation. As shown in FIG. 8, the encrypted hash values of a plurality of items in a group 831 respectively include a truncated encrypted hash value 821 while the encrypted hash values of a plurality of items in a group 832 respectively include a truncated encrypted hash value 822. Each record includes the encrypted hash value of the data chunk, location information of the data chunk in a new backup system and reference backup information (e.g., indicating old or new).

The encrypted hash values in the hash mapping file 800 are stored in a format of storage areas for quick search. In addition, if the location mapping file reaches a maximum size, items belonging to the oldest backup will be swapped out. Meanwhile, once an item is found in the location mapping file, the reference backup information is updated using the information of the latest backup. This will avoid swapping out the item because it is cited by the latest backup.

Figure 9:
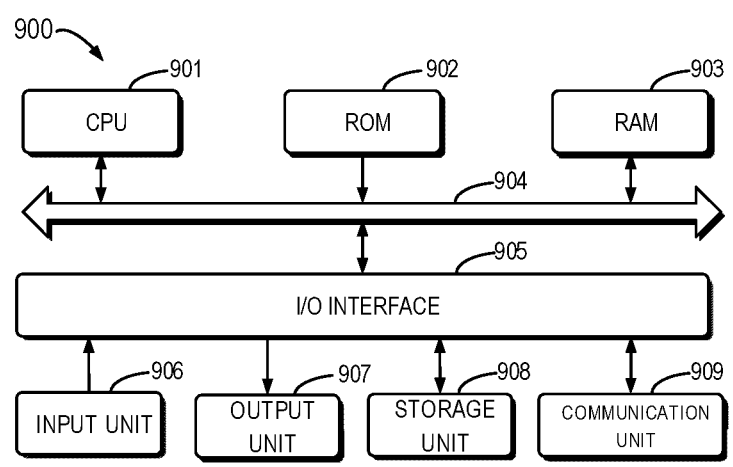
FIG. 9 illustrates a schematic block diagram of a device for implementing embodiments of the present disclosure.

FIG. 9 illustrates a schematic block diagram of a device 900 for implementing embodiments of the present disclosure. The device 900 may be a device or an apparatus described by embodiments of the present disclosure. As shown, the device 900 includes a central processing unit (CPU) 901, which may execute various suitable actions and processing based on the computer program instructions stored in a read-only memory (ROM) 902 or computer program instructions loaded in a random-access memory (RAM) 903 from a storage unit 908. The RAM 903 may also store all kinds of programs and data required by the operations of the device 900. The CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as a keyboard, a mouse and the like; an output unit 907, e.g., various kinds of displays and loudspeakers etc.; a storage unit 908, such as a disk and an optical disk etc.; and a communication unit 909, such as a network card, a modem, a wireless transceiver and the like. The communication unit 909 allows the device 900 to exchange information/data with other devices via a computer network, such as Internet, and/or various telecommunication networks.

The above described each method or process may be executed by the processing unit 901. For example, in some embodiments, the method may be implemented as a computer software program tangibly included in the machine-readable medium, e.g., storage unit 908. In some embodiments, the computer program may be partially or fully loaded and/or mounted to the device 900 via the ROM 902 and/or communication unit 909. When the computer program is loaded to the RAM 903 and executed by the CPU 901, one or more steps or acts of the above described method or process may be implemented.

In some embodiments the above described method and process may be implemented as a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but is not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), digital versatile disk (DVD), a memory stick, floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein may be downloaded from the computer-readable storage medium to each computing/processing device, or to an external computer or external storage via Internet, a local area network, a wide area network and/or a wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro-codes, firmware instructions, state setting data, or source codes or target codes written in any combinations of one or more programming languages, where the programming languages consist of object-oriented programming languages and conventional procedural programming languages, e.g., "C" language or similar programming languages. The computer-readable program instructions may be implemented fully on a user computer, partially on the user computer, as an independent software package, partially on the user computer and partially on a remote computer, or completely on the remote computer or server. In the case where a remote computer is involved, the remote computer may be connected to the user computer via any type of networks, including a local area network (LAN) and a wide area network (WAN), or to the external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause a computer, a programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented process. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by a device, a method and a computer program product according to multiple implementations of the present disclosure. In this regard, each block in the flow chart or block diagram may represent a module, a part of program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable others of ordinary skill in the art to understand respective embodiments of the present disclosure.

We claim:

1. A method for transmitting data, comprising:
   recovering data from a file to be transmitted in a first backup system;
   sending the recovered data to a backup client corresponding to a second backup system, the backup client being installed in a container of the first backup system, wherein the container includes a recovering container and a data sending container, the recovering container configured to recover the data in the first backup system, the data sending container configured to send the recovered data to the second backup system, and the first and the second backup systems being different types of backup systems, wherein sending the recovered data to the backup client corresponding to the second backup system comprises:
      in accordance with receiving, by a data transmission manager, a sending notification from the recovering container, allocating, by the data transmission manager, a memory for receiving data, the data transmission manager and the backup client being deployed in the data sending container;
      sending, by the data transmission manager, a reading notification to the backup client;
      notifying, by the data transmission manager, the recovering container to send the recovered data;
      receiving, by the data transmission manager, the recovered data from the recovering container; and
      sending, by the data transmission manager, the recovered data to the backup client; and
   transmitting the recovered data from the backup client installed in the first backup system to the second backup system.

2. The method of claim 1, wherein receiving the recovered data from the recovering container comprises:
   determining, by the data transmission manager, whether an available storage resource is present in the memory;
   in response to determining the available storage resource is present in the memory, continuing, by the data transmission manager, to receive the recovered data from the recovering container; and
   in response to determining the available storage resource is absent in the memory, notifying, by the data transmission manager, the recovering container to suspend sending data.

3. The method of claim 1, wherein sending the recovered data to the backup client comprises:
   determining, by the data transmission manager, whether available recovered data is present in the memory;
   in response to determining the available recovered data is present in the memory, continuing, by the data transmission manager, to send the recovered data to the backup client; and
   in response to determining the available recovered data is absent in the memory, notifying, by the data transmission manager, the backup client to suspend reading data from the memory.

4. The method of claim 1, wherein the sending notification comprises a file name, a file path and a file size, and the reading notification comprises the file name, the file path, the file size and an address of the memory.

5. The method of claim 1, wherein sending the recovered data to the backup client corresponding to the second backup system comprises:
   sending the recovered data to a further backup client corresponding to a third backup system concurrently while sending the recovered data to the backup client corresponding to the second backup system, so as to transmit data to the third backup system via the further backup client.

6. The method of claim 1, further comprising:
   determining a hash value of data chunks in the file to be transmitted;
   encrypting the hash value to obtain an encrypted hash value;
   determining whether the encrypted hash value is present in a location mapping file; and
   in response to determining that the encrypted hash value is absent in the location mapping file, transmitting the data chunks from the backup client to the second backup system and recording the encrypted hash value in the location mapping file.

7. The method of claim 6, further comprising:
   in response to determining that the encrypted hash value is present in the location mapping file, reading, from the location mapping file, location information of the data chunks in the second backup system, and notifying the second backup system to synthesize the data chunks.

8. The method of claim 7, wherein a plurality of truncated encrypted hash values are present in the location mapping file, each truncated encrypted hash value being mapped to a plurality of encrypted hash values including a truncated encrypted hash value.

9. An electronic device, comprising:
   a processing unit; and
   a memory coupled to the processing unit and storing instructions, the instructions, when executed by the processing unit, causing the device to perform acts of:
      recovering data from a file to be transmitted in a first backup system;
      sending the recovered data to a backup client corresponding to a second backup system, the backup client being installed in a container of the first backup system, wherein the container includes a recovering container and a data sending container, the recovering container configured to recover the data in the first backup system, the data sending container configured to send the recovered data to the second backup system, and the first and the second backup systems being different types of backup systems, wherein sending the recovered data to the backup client corresponding to the second backup system comprises:
         in accordance with receiving, by a data transmission manager, a sending notification from the recovering container, allocating, by the data transmission manager, a memory for receiving data, the data transmission manager and the backup client being deployed in the data sending container;

sending, by the data transmission manager, a reading notification to the backup client;

notifying, by the data transmission manager, the recovering container to send the recovered data;

receiving, by the data transmission manager, the recovered data from the recovering container; and sending, by the data transmission manager, the recovered data to the backup client; and transmitting the recovered data from the backup client installed in the first backup system to the second backup system.

10. The device of claim 9, wherein receiving the recovered data from the recovering container comprises:

determining, by the data transmission manager, whether an available storage resource is present in the memory;

in response to determining the available storage resource is present in the memory, continuing, by the data transmission manager, to receive the recovered data from the recovering container; and in response to determining the available storage resources is absent in the memory, notifying, by the data transmission manager, the recovering container to suspend sending data.

11. The device of claim 9, wherein sending the recovered data to the backup client comprises:

determining, by the data transmission manager, whether available recovered data is present in the memory;

in response to determining the available recovered data is present in the memory, continuing, by the data transmission manager, to send the recovered data to the backup client; and in response to determining the available recovered data is absent in the memory, notifying, by the data transmission manager, the backup client to suspend reading data from the memory.

12. The device of claim 9, wherein the sending notification comprises a file name, a file path and a file size, and the reading notification comprises the file name, the file path, the file size and an address of the memory.

13. The device of claim 9, wherein sending the recovered data to the backup client corresponding to the second backup system comprises:

sending the recovered data to a further backup client corresponding to a third backup system concurrently while sending the recovered data to the backup client corresponding to the second backup system, so as to transmit data to the third backup system via the further backup client.

14. The device of claim 9, wherein the acts further comprising:

determining a hash value of data chunks in the file to be transmitted;

encrypting the hash value to obtain an encrypted hash value;

determining whether the encrypted hash value is present in a location mapping file; and in response to determining that the encrypted hash value is absent in the location mapping file, transmitting the data chunks from the backup client to the second backup system and recording the encrypted hash value in the location mapping file.

15. The device of claim 14, wherein the acts further comprise:

in response to determining that the encrypted hash value is present in the location mapping file, reading, from the location mapping file, location information of the data chunks in the second backup system, and notifying the second backup system to synthesize the data chunks.

16. The device of claim 15, wherein a plurality of truncated encrypted hash values are present in the location mapping file, each truncated encrypted hash value being mapped to a plurality of encrypted hash values.

17. A computer program product being tangibly stored on a non-transitory computer-readable medium and comprising machine-executable instructions, which, when executed, cause a machine to perform operations, the operations comprising:

recovering data from a file to be transmitted in a first backup system;

sending the recovered data to a backup client corresponding to a second backup system, the backup client being installed in a container of the first backup system, wherein the container includes a recovering container and a data sending container, the recovering container configured to recover the data in the first backup system, the data sending container configured to send the recovered data to the second backup system, and the first and the second backup systems being different types of backup systems, wherein sending the recovered data to the backup client corresponding to the second backup system comprises:

in accordance with receiving, by a data transmission manager, a sending notification from the recovering container, allocating, by the data transmission manager, a memory for receiving data, the data transmission manager and the backup client being deployed in the data sending container;

sending, by the data transmission manager, a reading notification to the backup client;

notifying, by the data transmission manager, the recovering container to send the recovered data;

receiving, by the data transmission manager, the recovered data from the recovering container; and sending, by the data transmission manager, the recovered data to the backup client; and transmitting the recovered data from the backup client installed in the first backup system to the second backup system.

* * * * *